US009089243B2

(12) United States Patent
Harris et al.

(10) Patent No.: US 9,089,243 B2
(45) Date of Patent: *Jul. 28, 2015

(54) DRIVE SYSTEM FOR HOUSEHOLD IMPLEMENTS INCLUDING FOOD PROCESSOR

(71) Applicants: Columbia Insurance Company, Omaha, NE (US); Leifheit AG, Nassau (DE)

(72) Inventors: E. Mark Harris, McHenry, IL (US); Markus Klotz, Hainau (DE)

(73) Assignees: Columbia Insurance Company, Omaha, NE (US); Leifheit AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,907

(22) Filed: Dec. 16, 2013

(65) Prior Publication Data

US 2014/0116164 A1     May 1, 2014

Related U.S. Application Data

(63) Continuation of application No. 13/075,708, filed on Mar. 30, 2011, now Pat. No. 8,695,490.

(30) Foreign Application Priority Data

Apr. 1, 2010    (DE) .......................... 10 2010 016 322
May 26, 2010   (DE) .......................... 10 2010 017 099

(51) Int. Cl.
*A23N 4/04*     (2006.01)
*A47J 43/08*    (2006.01)
(Continued)

(52) U.S. Cl.
CPC ............ *A47J 43/082* (2013.01); *A47J 43/1031* (2013.01); *F16H 19/001* (2013.01);
(Continued)

(58) Field of Classification Search
CPC ..... A47J 43/082; A47J 43/1031; A47J 43/24; A47J 43/284; A47J 43/145; A47J 43/08; F16H 19/04
USPC ......................................................... 241/100
See application file for complete search history.

(56) References Cited

U.S. PATENT DOCUMENTS

| 20,830 A | 7/1858 | Taylor |
|---|---|---|
| 1,517,519 A | 12/1924 | Stillians |

(Continued)

FOREIGN PATENT DOCUMENTS

| DE | 580073 A1 | 7/1933 |
|---|---|---|
| DE | 102010016322816 | 4/2010 |

(Continued)

OTHER PUBLICATIONS

International Search Report for App. No. PCT/US2011/037914, dated Feb. 20, 2012.

(Continued)

*Primary Examiner* — Vinh Luong
(74) *Attorney, Agent, or Firm* — Neal, Gerber & Eisenberg, LLP (57) ABSTRACT

A drive assembly is provided. The drive assembly includes a gear housing comprising a support surface for a hand of a user, a gear drive mechanism disposed within the gear housing, and a handle member disposed on the gear housing proximate to the support surface. The gear drive mechanism includes a first drive gear rotatable about a first axis of rotation and engaged to the handle member, a second drive gear rotatable about a second axis of rotation, and a driven member engaged to the implement and driven by the second drive gear about a third axis of rotation that extends through the support surface. The driven member is disposed at least partially outside of the gear housing and is driven only when the handle member is moved from an unfired position to a fired position. The handle member does not cross the third axis of rotation during such movement.

14 Claims, 8 Drawing Sheets

(51) Int. Cl.
*A47J 43/10* (2006.01)
*F16H 19/00* (2006.01)
*F16H 19/04* (2006.01)

(52) U.S. Cl.
CPC ............ *F16H 19/04* (2013.01); *Y10T 74/1524* (2015.01); *Y10T 74/18096* (2015.01); *Y10T 74/19874* (2015.01); *Y10T 74/19884* (2015.01); *Y10T 74/19972* (2015.01); *Y10T 74/19995* (2015.01)

(56) References Cited

U.S. PATENT DOCUMENTS

| | | |
|---|---|---|
| 2,143,236 A | 1/1939 | Birk |
| 2,178,889 A | 11/1939 | Gabrieau |
| 2,507,681 A | 5/1950 | Sage |
| 2,523,165 A | 9/1950 | Tice |
| 2,552,572 A | 5/1951 | Mikina |
| 2,664,127 A | 12/1953 | Perrelli |
| 2,666,399 A | 1/1954 | Pereyra |
| 3,154,123 A | 10/1964 | Tomlinson |
| 3,825,249 A | 7/1974 | Zimmer |
| 3,869,935 A | 3/1975 | Mathieu et al. |
| 3,952,607 A | 4/1976 | Ring |
| 3,957,215 A | 5/1976 | Otto et al. |
| 3,992,960 A | 11/1976 | Rulseh |
| 4,125,033 A | 11/1978 | Riedl |
| 4,231,405 A | 11/1980 | Vila |
| 4,233,774 A | 11/1980 | Sahar |
| 4,282,779 A | 8/1981 | Kato |
| 4,352,299 A | 10/1982 | Riggs et al. |
| 4,543,839 A | 10/1985 | Buchanan, Jr. et al. |
| 4,643,692 A | 2/1987 | Magers |
| 4,756,203 A | 7/1988 | Matsuda et al. |
| 4,763,567 A | 8/1988 | Dalquist et al. |
| 4,765,195 A | 8/1988 | Takami |
| 4,889,013 A | 12/1989 | Pitassi et al. |
| 4,907,474 A | 3/1990 | Bolger |
| 4,967,970 A | 11/1990 | Michel |
| 5,064,535 A | 11/1991 | Hsu |
| 5,156,084 A | 10/1992 | Lin |
| D331,170 S | 11/1992 | Greiner |
| 5,161,508 A | 11/1992 | Zentgraf et al. |
| 5,184,544 A | 2/1993 | Ling |
| 5,199,788 A | 4/1993 | Stallings |
| D361,694 S | 8/1995 | Wong |
| 5,562,025 A | 10/1996 | Bull et al. |
| D376,063 S | 12/1996 | Bull et al. |
| 5,632,450 A | 5/1997 | Moor |
| 5,735,193 A | 4/1998 | Chang |
| D395,194 S | 6/1998 | Wong |
| 5,765,947 A | 6/1998 | Dubroy |
| D402,165 S | 12/1998 | Bull |
| 5,934,179 A | 8/1999 | Schmid et al. |
| D413,761 S | 9/1999 | Conran et al. |
| 5,960,709 A | 10/1999 | Yip et al. |
| D415,938 S | 11/1999 | Blaise |
| 6,018,883 A | 2/2000 | Mulhauser |
| 6,035,771 A | 3/2000 | Conran et al. |
| D426,743 S | 6/2000 | Wong |
| D426,744 S | 6/2000 | Wong |
| D427,011 S | 6/2000 | Yip |
| D430,775 S | 9/2000 | Wong |
| D433,594 S | 11/2000 | Wong |
| D433,871 S | 11/2000 | Wong |
| D434,597 S | 12/2000 | Yip |
| D447,017 S | 8/2001 | Jalet |
| 6,302,014 B1 | 10/2001 | Kuan |
| 6,467,711 B2 | 10/2002 | Michel et al. |
| 6,510,785 B1 | 1/2003 | Margolin |
| 6,609,455 B2 | 8/2003 | Fouquet |
| 6,622,618 B1 * | 9/2003 | Glucksman et al. ............ 99/495 |
| 6,626,055 B2 | 9/2003 | Magaribuchi |
| D480,613 S | 10/2003 | Wong |
| D481,271 S | 10/2003 | Herren |
| 6,634,580 B2 | 10/2003 | Obersteiner |
| 6,676,051 B2 | 1/2004 | Rebordosa et al. |
| 6,709,256 B2 | 3/2004 | Tashiro et al. |
| 6,718,838 B2 | 4/2004 | Joyce et al. |
| 6,722,222 B1 | 4/2004 | Dolan et al. |
| 7,059,553 B2 | 6/2006 | Mueller |
| 7,100,854 B2 | 9/2006 | Aby-Eva |
| 7,146,896 B2 | 12/2006 | Chang |
| 7,152,821 B2 | 12/2006 | Aby-Eva et al. |
| D538,605 S | 3/2007 | Wan |
| D538,606 S | 3/2007 | Hood |
| 7,258,292 B2 | 8/2007 | Cheung |
| 7,311,280 B2 | 12/2007 | Herren |
| 7,422,169 B2 | 9/2008 | Mueller |
| 7,581,463 B2 | 9/2009 | Jacobs et al. |
| 7,621,213 B2 | 11/2009 | Wong |
| 7,669,793 B2 | 3/2010 | So et al. |
| 7,677,124 B2 | 3/2010 | Honma |
| 7,681,495 B2 | 3/2010 | Wan et al. |
| 7,975,605 B2 | 7/2011 | Wan et al. |
| 7,975,947 B2 | 7/2011 | Horstmann |
| 7,975,948 B2 * | 7/2011 | Holcomb et al. .......... 241/169.1 |
| 8,402,886 B2 | 3/2013 | Herren |
| 2001/0003925 A1 | 6/2001 | Swan |
| 2004/0182958 A1 | 9/2004 | Herren |
| 2005/0061898 A1 | 3/2005 | Whitmer |
| 2005/0217405 A1 | 10/2005 | Suzuki |
| 2006/0021457 A1 | 2/2006 | Jacobs et al. |
| 2007/0180727 A1 * | 8/2007 | Wan et al. ......................... 34/58 |
| 2008/0067029 A1 | 3/2008 | Garrick et al. |
| 2008/0163768 A1 | 7/2008 | Glucksman et al. |
| 2008/0210103 A1 * | 9/2008 | Wan et al. ...................... 99/495 |
| 2008/0223226 A1 | 9/2008 | Holcomb et al. |
| 2008/0277513 A1 | 11/2008 | Holcomb et al. |
| 2009/0045274 A1 | 2/2009 | So et al. |
| 2009/0090254 A1 | 4/2009 | Herren |
| 2009/0114104 A1 | 5/2009 | Sawhney et al. |
| 2009/0160275 A1 | 6/2009 | Keefover et al. |
| 2009/0178580 A1 | 7/2009 | Herren |
| 2009/0236453 A1 | 9/2009 | Heng et al. |
| 2012/0047753 A1 * | 3/2012 | Mah et al. ....................... 30/418 |
| 2013/0036621 A1 * | 2/2013 | Kilduff et al. ..................... 34/58 |
| 2014/0014752 A1 * | 1/2014 | Beber et al. .................... 241/100 |

FOREIGN PATENT DOCUMENTS

| | | | |
|---|---|---|---|
| DE | 102010017099216 | | 5/2010 |
| EP | 0345223 B1 | | 11/1994 |
| EP | 1253997 B1 | | 7/2003 |
| EP | 1964499 A1 | | 9/2008 |
| FR | 2532540 A1 | | 9/1984 |
| GB | 1426002 | * | 2/1976 .......... A47J 43/1031 |
| GB | 1481283 A | | 7/1977 |
| JP | 2008220945 | | 9/2008 |
| WO | 0158652 A1 | | 8/2001 |
| WO | 0209565 A1 | | 2/2002 |
| WO | 2004063647 A1 | | 7/2004 |
| WO | 2004073474 A1 | | 9/2004 |
| WO | 2007128153 A1 | | 11/2007 |
| WO | 2007128154 A1 | | 11/2007 |
| WO | 2007128155 A1 | | 11/2007 |

OTHER PUBLICATIONS

International Search Report for App. No. PCT/US2011/030522, dated Dec. 20, 2011.

European Search Report from Application No. EP 07 25 0871 (Patent No. EP 1 964 499 A 1), along with Patent No. EP 1 964 499 A 1 P.

Australian Patent Examination Report No. 1 issued May 23, 2014 for Australian Patent Application No. 2011235170.

* cited by examiner

DRIVE SYSTEM FOR HOUSEHOLD IMPLEMENTS INCLUDING FOOD PROCESSOR

CROSS-REFERENCE

This application is a continuation of U.S. patent application Ser. No. 13/075,708 filed on Mar. 30, 2011, which claims priority from German Patent Application Serial No. 10 2010 016 322.8-16, filed on Apr. 1, 2010, and German Patent Application Serial No. 10 2010 017 099.2, filed on May 26, 2010. The contents of these prior applications are incorporated herein by reference.

BACKGROUND OF THE INVENTION

This invention relates to a driving unit to transmit force from one object to another.

SUMMARY OF THE INVENTION

A driving unit is described herein. According to one aspect, a drive device for a device for treating or processing food is provided. The drive device includes a housing that can be attached to a base; an actuating lever articulated on the housing in a lever bearing in a pivotable manner about a first axis of rotation; and a force transfer mechanism driven by the actuating lever to rotate an output shaft extending from the housing into the base about a second axis of rotation that is perpendicular to the first axis of rotation. The actuating lever is lowered from an upright position in the direction of the housing for driving the force transfer mechanism. Further, the lever bearing is located such that the area through which the actuating lever passes during the actuation of the actuating lever is located laterally next to at least one plane that is perpendicular to the first axis of rotation and passes through the second axis of rotation.

According to another aspect, a processing device for processing food is provided. The processing device includes a base, which accommodates the food, in the form of a bowl; a removable housing which closes the bowl; an operating tool positioned within the bowl; and an output shaft extending from the housing and driving the operating tool. The output shaft can be driven via a drive device so as to rotate about a first axis of rotation. The drive device comprises an actuating lever pivotally mounted on the removable housing in a lever bearing; and a force transfer mechanism which is capable of transferring a pivot motion of the actuating lever into a drive of a force output. The actuating lever can be towered from an upright position in the direction of the removable housing for driving the force transfer mechanism, the force output rotating the operating toot about the first axis of rotation. Further, the lever bearing is disposed such that the area through which the actuating lever passes during actuation is located laterally next to at least one plane that passes through the first axis of rotation.

According to yet another aspect, a drive unit movable between an unfired position and a fired position to drive an implement is provided. The drive unit includes a frame; a housing engaged to the frame, the housing comprising a support surface for a hand of a user; a base engaged to the frame and forming a cavity therebetween; a first drive gear disposed in the cavity and having a first axis of rotation; a handle member engaged to the first drive gear, the handle member disposed outside of the cavity, proximate to the support surface; a second drive gear disposed in the cavity and having a second axis of rotation, the second drive gear engaged to the first drive gear; and a driven member having a third axis of rotation and disposed at least partially outside of the cavity. The driven member is driven only when the drive unit is moved from the unfired position to the fired position, and the third axis of rotation extends through the support surface. Further, the handle member does not cross the third axis of rotation.

A better understanding of the invention will be obtained from the following detailed descriptions and accompanying drawings, which set forth one or more illustrative embodiments that are indicative of the various ways in which the principals of the invention may be employed.

DETAILED DESCRIPTION OF THE DRAWINGS

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

Figure 1:
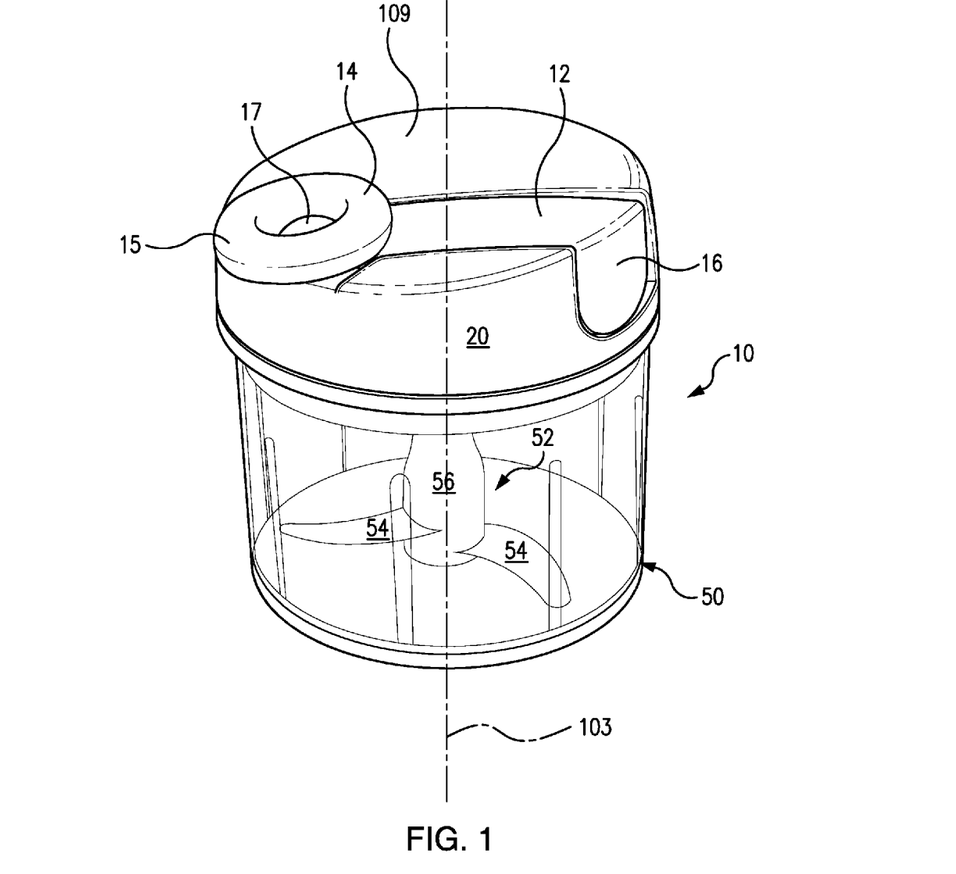
FIG. 1 is a perspective view of a first embodiment of a kitchen utensil as described herein.

The present invention is described herein with respect to a drive unit that is used to transmit force from one object to another. It may be used, for example, with an exemplary kitchen utensil 10, which is shown in FIG. 1. It will be understood that the drive mechanism disclosed herein may be used in other applications.

In the depicted embodiment, kitchen utensil 10 comprises handle member 12, which comprises first end 14 having a gripping portion 15, and second end 16 that is engaged to lid 20. In order to provide for the placement of the user's hand on the lid 20 in order to stabilize kitchen utensil 10, in the depicted embodiments, the lid 20 includes a support surface 109, and handle member 12 is offset from the axis of rotation 103 of implement 52 and from the support surface 109.

As depicted in FIG. 1, handle member 12 is rotatably engaged to lid 20 by means of a pair of shafts 24, to move between an "up position" (not shown) and a "down" position, shown, e.g., in FIG. 1. The scope of the present invention includes embodiments with different means of engagement. For example, handle member 12 may slide laterally along lid 20 to motivate drive train 30. Handle lock 17 is disposed on lid 20 proximate to gripping portion 15. Handle lock 17 is movable between a first position, in which handle member 12 is prevented from moving with respect to lid 20, and a second position, in which handle member 12 is permitted to move with respect to lid 20. By way of additional example, the means of engagement may not be a handle member, but may also comprise a pull cord, a button, a crank, or any other means of engagement.

The depicted food processor embodiment includes base 21 (or drive train 30) engaged to container 50. Disposed within container 50 to act on food (not shown) that is placed in container 50 is processing implement 52, which is propelled by handle member 12 as described in detail below. Processing implement 52 may comprise a plurality of blades 54 disposed about central pillar 56 in order to slice or chop the food. Other processing implements may employed in a food processing device, such as a basket, whisk, etc. In other applications, a different rotated element will be used in place of processing implement 52.

Figure 2:
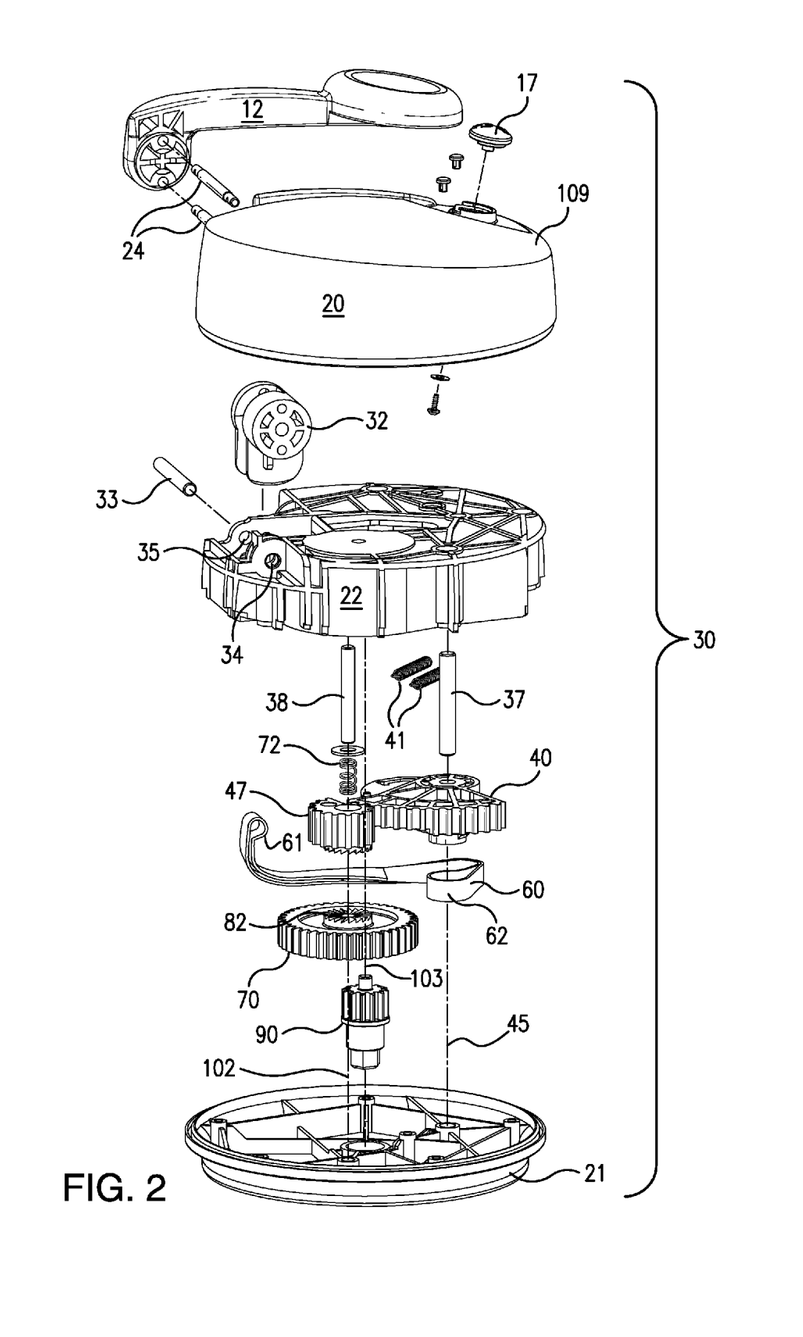
FIG. 2 is an exploded view of an embodiment of a drive train for the kitchen utensil of FIG. 1.

FIG. 2 depicts drive train 30 of kitchen utensil 10. Lobe 32 is rotatably engaged to frame 22, and is driven by handle member 12. In the depicted embodiment, lobe 32 is disposed on axle 33, which is disposed in holes 34 and 35 formed in frame 22. A pair of shafts 24 engage both handle member 12 and lobe 32 and transfer rotation from handle member 12 to lobe 32.

Various components are disposed in a cavity formed between frame 22 and base 21. Flexible link 60 comprises first end 61 engaged to lobe 32 and second end 62. In the depicted embodiment, flexible link 60 is a single piece of fabric double over itself in order to form a loop at each end 61 and 62. However, it will be appreciated by those in the art that the scope of the invention includes any flexible link. Flexible link 60 is engaged to lobe 32 proximate to first end 61. In this manner, rotation of handle member 12 causes linear movement of flexible link 60, as depicted, for example, by arrows 63 and 64 in FIG. 9.

A stepless gear mechanism drives pinion gear 90 with a torque that is initially high and gradually moves to low as handle member 12 moves from the un-fired position to the fired position, while driving pinion gear 90 with low speed and gradually moving to high speed as handle member is moved from the un-fired position to the fired position. In the first embodiment, quarter pinion 40 is likewise disposed within the cavity, and rotates about shaft 37. In the depicted embodiment, quarter pinion 40 will only rotate about 90 degrees when handle member 12 is cycled from its up position to its down position. As such, the beginning of the rotation cycle for quarter pinion corresponds to the up position of handle member 12, while the end of the rotation cycle corresponds to the down position. As seen in detail in FIGS. 2, 6 and 7, quarter pinion 40 comprises arcuate gear form 42 and rotates about axis of rotation 45. Arcuate gear form 42 has a first end 43 located a distance d1 from axis of rotation 45, and a second end 44 located a distance d2 from axis of rotation 45, wherein d1 is less than d2. In this manner, the torque required to rotate quarter pinion 40 is greater at the beginning of the rotation cycle than at the end of the rotation cycle.

Figure 6:
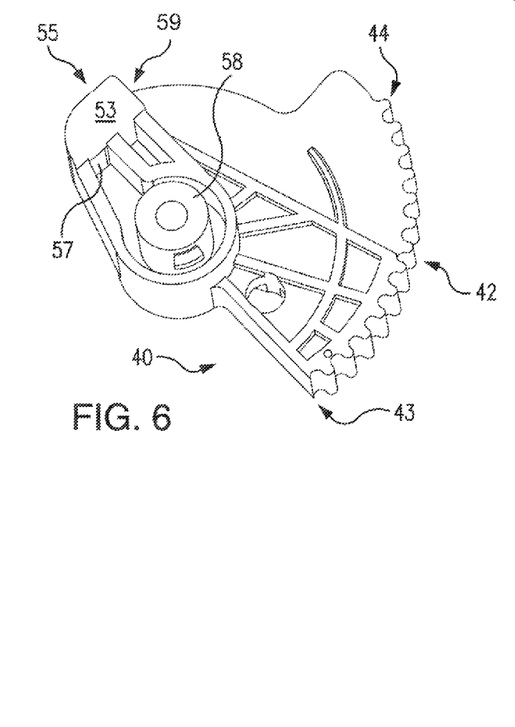
FIG. 6 is a perspective view of an embodiment of a quarter pinion gear of the drive train of FIG. 2.
Figure 7:
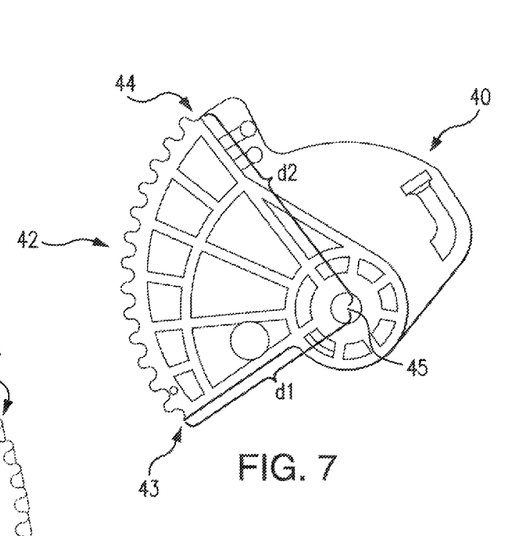
FIG. 7 is a top plan view of the quarter pinion of FIG. 6.
Figure 8:
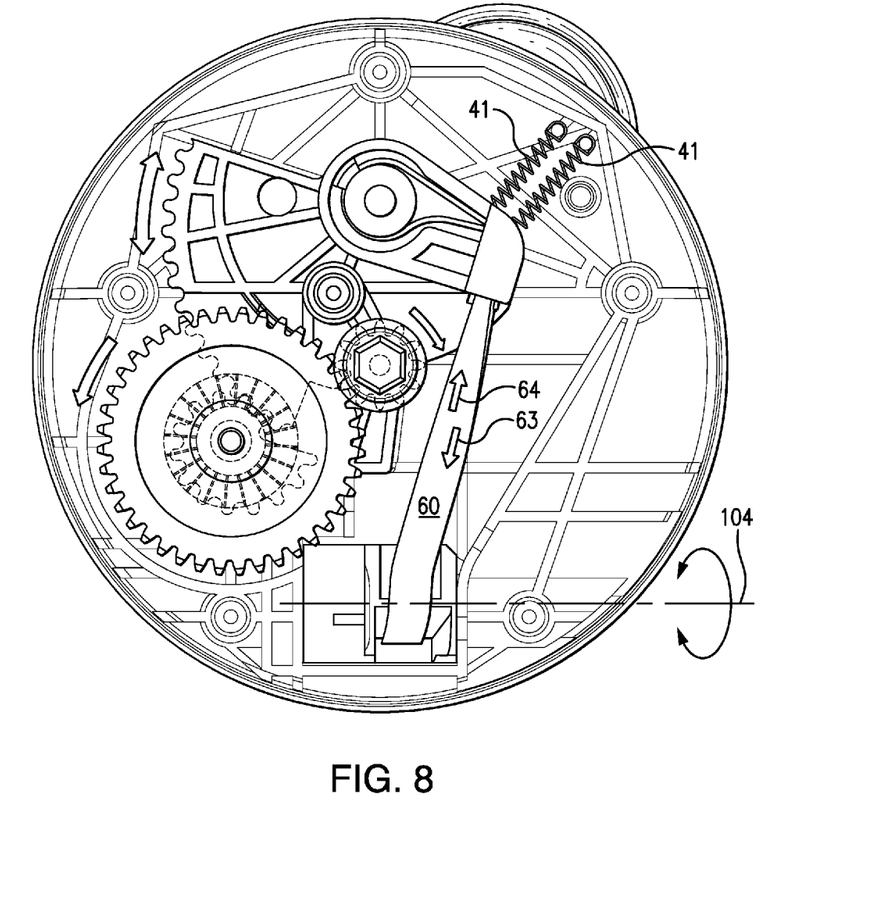
FIG. 8 is a bottom view of the assembled drive train of FIG. 2, with the drive train at the end of the cycle.

As seen in detail in FIG. 6, quarter pinion 40 further comprises structure 55 formed on a first side thereof to engage flexible link 60. As depicted, second end 62 of flexible link 60 is formed into a loop, which is disposed in internal section 53 of structure 55 and wraps around anchor 58, and a portion of flexible link 60 passes through entrance 59 and exit 57. As seen, entrance 56 and exit 57 are perpendicular to one another. As a result, lateral movement of flexible link 60 results in rotation of quarter pinion 40.

Springs 41(*a*) and (*b*) are engaged to frame 22 and quarter pinion 40, and bias quarter pinion 40 to the beginning of its rotation cycle, as described above. Springs 41(*a*) and (*b*) may be replaced by one spring 41, but a single spring must be of sufficient strength to overcome the strength of spring 72. Spring 72 applies appropriate force to engage engagement means 81 and 82, allowing for rotational re-set of handle member 12, as described in detail below.

Figure 10:
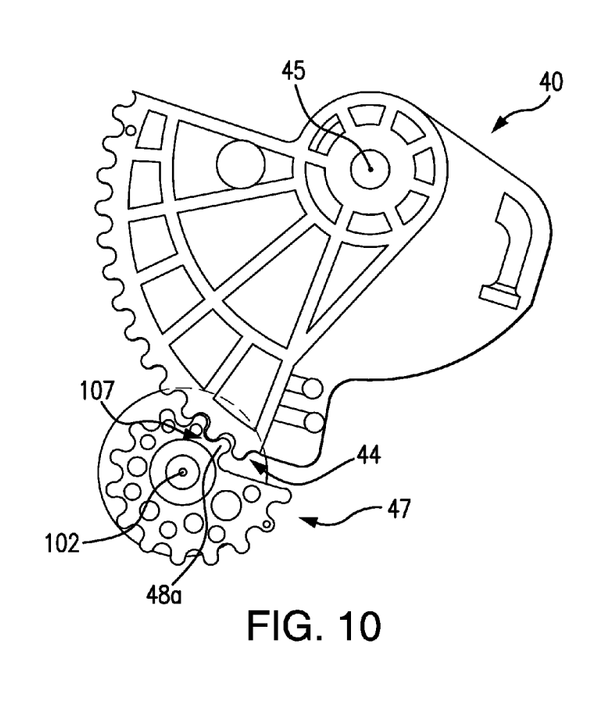
FIG. 10 is a top view of the embodiment disclosed in FIG. 2 in the fired position, showing just the spiral radius gear and the quarter pinion gear for clarity.
Figure 11:
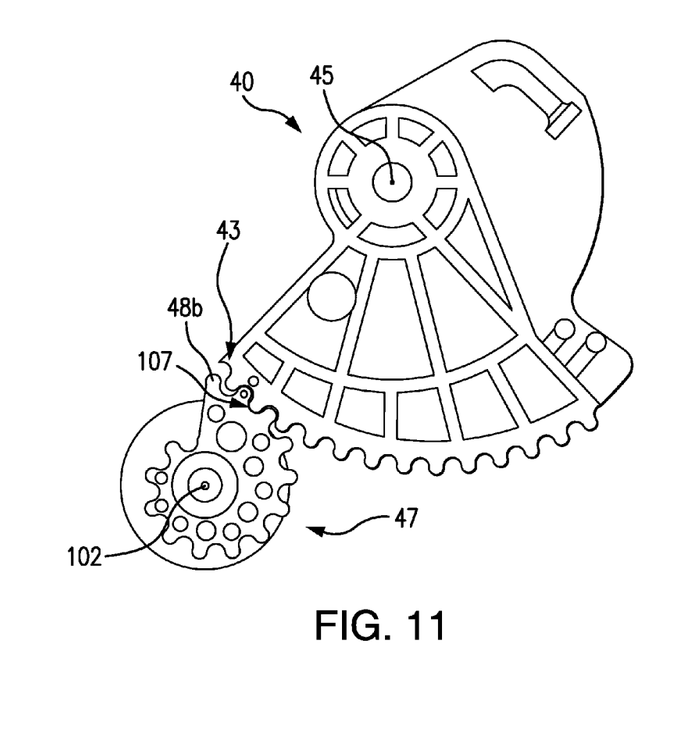
FIG. 11 is a top view of the embodiment disclosed in FIG. 10 in the un-fired position, showing just the spiral radius gear and the quarter pinion gear for clarity.

A first embodiment of the present invention is depicted in FIGS. 10 and 11. As seen, quarter pinion 40 is drivingly engaged, at a mesh point 107, to spiral radius gear 47, which rotates about shaft 38. As seen in detail in, for example, FIG. 4, spiral radius gear 47 comprises gear form 48 formed on the periphery thereof. The radius of the gear form 48 constantly increases, and causes gear form 48 to appear as a spiral. For example, tooth 48*a* is closer to the axis of rotation 102 of spiral radius gear 47 than is tooth 48*b*. In this manner, the torque required to move spiral radius gear 47 gradually decreases through the rotation cycle. Additionally, the small radius of spiral radius gear 47 correspond to, and engage with, the large distance d2 of quarter pinion 40, while the large radius of spiral radius gear 47 correspond to, and engage with, the small distance d1 of quarter pinion 40. By way of example, tooth 48*a* engages quarter pinion 40 proximate to second end 44, while tooth 48*b* engages quarter pinion 40 proximate to first end 43.

Figure 3:
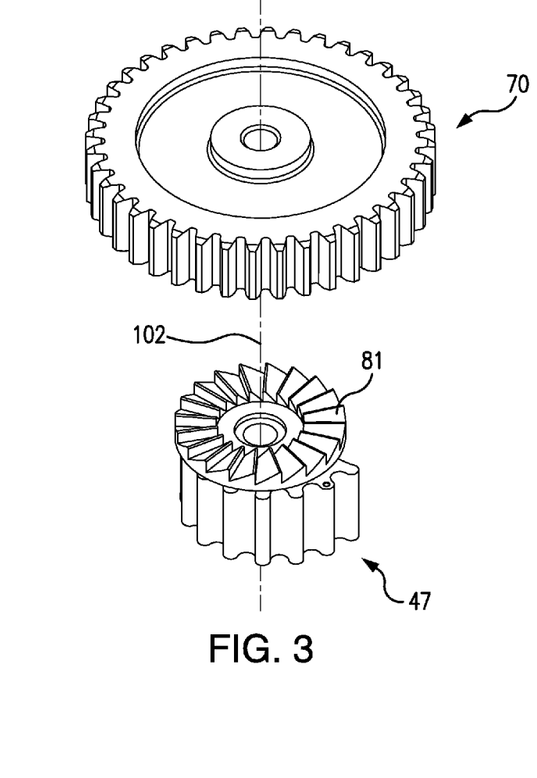
FIG. 3 is an exploded close up of an embodiment of a spiral radius gear and a spur gear of the drive train of FIG. 2, with the spur gear on top.
Figure 4:
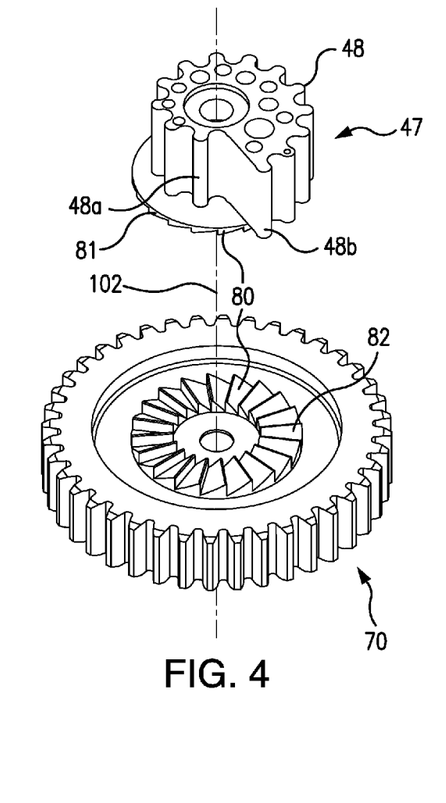
FIG. 4 is an exploded close up of an embodiment of a spiral radius gear and a spur gear of the drive train of FIG. 2, with the spiral gear on top.

Spiral radius gear 47 is drivingly disposed on spur gear 70, which also rotates about shaft 38. Spiral radius gear 47 drives spur gear 70 through engagement means 80, which allows spiral radius gear 47 to transmit rotation to spur gear 70 only when rotated in one direction. As seen in FIGS. 3 and 4, a first engagement means 81 is formed on spiral radius gear 47, while a corresponding second engagement means 82 is formed on spur gear 70. In the depicted embodiment, both engagement means 81 and 82 comprise a series of ramps, ending in a near-vertical side, or even a negative angle with respect to vertical. When spiral radius gear 47 is rotated in a first direction (i.e., clockwise in FIG. 4), the vertical sides of engagement means 81 and 82 engage each other, and rotation is transferred from spiral radius gear 47 to spur gear 70. When spiral radius gear 47 is rotated in a second direction, opposite the first direction (i.e., counter-clockwise in FIG. 4), the ramps of engagement means 81 and 82 engage and slide over each other. In this direction, spiral radius gear 47 is rotated, but no rotation is transferred to spur gear 70. Spring 72 is disposed about shaft 38 and engaged to spiral radius gear 47, biasing spiral radius gear 47 into engagement with spur gear 70.

Figure 5:
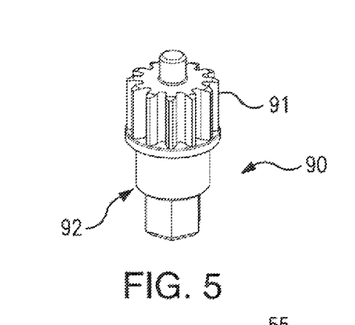
FIG. 5 is an embodiment of a pinion gear of the drive train of FIG. 2.

Spur gear 70 is engaged to pinion 90. As depicted in detail in, for example, FIG. 5, pinion 90 comprises gear form 91 and extension 92, which extends from gear form 91, through base 21 into container 50. Processing implement 52 engages pinion 90 through extension 92.

Figure 12:
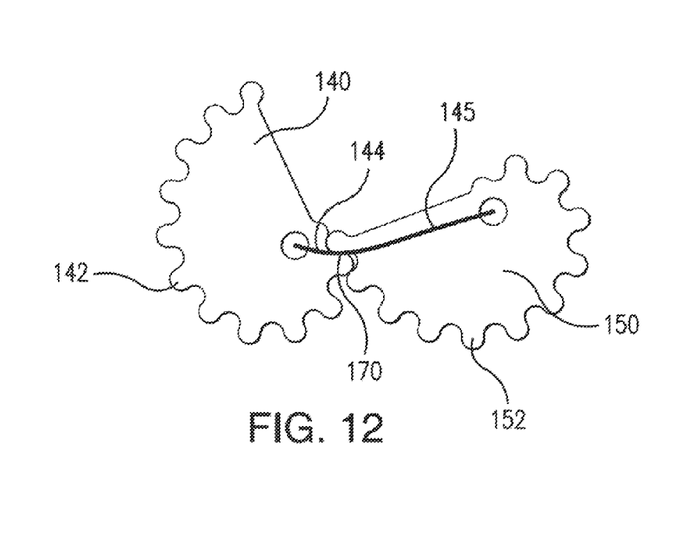
FIG. 12 is a top view of a second embodiment of a drive train in the fired position, showing just the first quarter pinion gear and the second quarter pinion gear for clarity.
Figure 13:
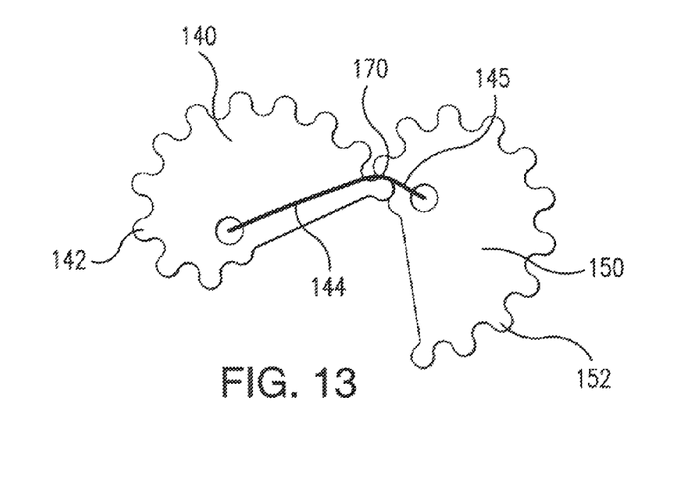
FIG. 13 is a top view of embodiment of the drive train disclosed in FIG. 12 in the un-fired position, showing just the first quarter pinion gear and the second quarter pinion gear for clarity.

A second embodiment of the present invention is depicted, for example, in FIGS. 12 and 13. For the sake of simplicity, FIGS. 12 and 13, like FIGS. 10 and 11, depict only the engagement between first quarter pinion 140 and second quarter pinion 150.

FIG. 12 shows an initial state of the drive device before the handle member 12 is moved from the unfired position to the fired position.

The first and second quarter pinions 140 and 150 are constructed as semi-circular disc elements and have teeth 142 and 152, respectively, distributed over the circumference. The two quarter pinions 140 and 150 engaged each other at engagement point 170.

In the initial state depicted in FIG. 12, a first spacing 144 between the axis of rotation of first quarter pinion 140 and the engagement point 170 is smaller than a second spacing 145 between the axis of rotation of second quarter pinion 150 and the engagement point 170.

FIG. 13 depicts first and second quarter pinions 140 and 150 after handle member 12 has been fired. In the position shown in FIG. 13, the first spacing 144 is larger than the second spacing 145.

In this way, the fulcrum of first quarter pinion 140 changes during the cycle of actuation of handle member 12. For example, the length of the first spacing 144 increases, starting from the state shown in FIG. 12 to the state shown in FIG. 13. Simultaneously, the fulcrum of second quarter pinion 150 also changes during the cycle of actuation of handle member 12. For example, the length of the second spacing 145 decreases, starting from the length shown in FIG. 12 and ending in the length depicted in FIG. 13.

The operation of depicted kitchen utensil 10 is as follows, and is described with respect to the first embodiment described above. It will be appreciated by those in the art that the description of the operation applies to the second embodiment described above as well.

Figure 9:
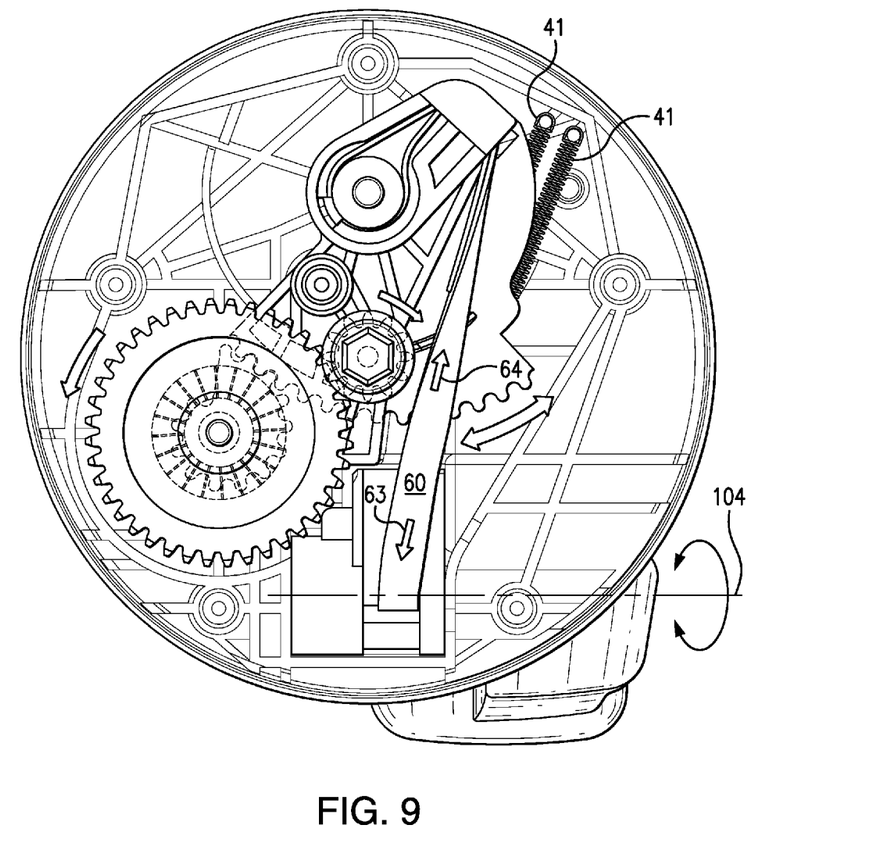
FIG. 9 is a bottom view of the assembled drive train of FIG. 2, with the drive train at the beginning of the cycle.

In storage, handle member 12 is locked in the down, fired position against lid 20, as depicted in FIG. 1. In this position, spring 72 is extended, and quarter pinion 40 and spiral radius gear 47 are at the end of their respective rotational cycles. When handle member 12 is unlocked, spring 72 biases quarter pinion 40 to the beginning of its rotational cycle, causing handle member 12 to rotate, along an axis of rotation 104, to near vertical with respect to lid 20, as depicted in FIG. 9. As a user rotates handle member 12 toward lid 20, along the axis of rotation 104, spring 72 again becomes extended and flexible link 60 is pulled in a first lateral direction, depicted as arrow 63 in FIG. 9, causing quarter pinion 40 to begin its rotation cycle. Quarter pinion 40 rotates spiral radius gear 47. In this direction, the engagement means 80 transfers rotation from spiral radius gear 47 to spur gear 70, which then turns pinion 90, which turns processing implement 52 in one direction only.

After handle member reaches lid 20, the user releases handle member 12. Again, springs 41(*a*) and (*b*) bias quarter pinion 40 back to the beginning of the rotational cycle. This causes flexible link 60 to be pulled in the second lateral direction, depicted in FIG. 9, again causing handle member to rotate to the near vertical position depicted in FIG. 9. This also causes spiral radius gear 47 to rotate back to the beginning of its rotational cycle. However, because this rotation is in the opposite direction from that described above, engagement means 80 does not permit rotation to be transferred to spur gear 70. Thus, processing implement 52 is only rotated in one direction.

While specific configurations of the invention have been described in detail, it will be appreciated by those skilled in the art that various modifications and alternatives to those details could be developed in light of the overall teachings of this disclosure. The particular arrangements disclosed herein are meant to be illustrative only and not limited as to the scope of the invention which is to be given the full breadth of the appended claims and any equivalents thereof.

What is claimed is:

1. A drive assembly for ing all implement, the drive assembly comprising:
   a gear housing comprising a support surface for placement of a hand of a user;
   a gear drive mechanism disposed within the gear housing, the gear drive mechanism including:
      a first drive gear rotatable about a first axis of rotation;
      a second drive gear rotatable about a second axis of rotation, the second drive gear being engaged to the first drive gear; and
      a driven member driven by the second drive gear and rotatable about a third axis of rotation, the driven member being disposed at least partially outside of the gear housing and being engaged to the implement; and
   a handle member engaged to the first drive gear and movable between an unfired position and a fired position, the handle member being disposed on the gear housing proximate to the support surface,
   wherein the driven member is driven only when the handle member is moved from the unfired position to the fired position, and
   wherein the third axis of rotation extends through the support surface, and the handle member does not cross the third axis of rotation as the handle member is moved from the unfired position to the fired position, and
   wherein the third axis of rotation extends through the center of the gear housing.

2. The drive assembly of claim 1, wherein the gear drive mechanism further comprises:
   a first pinion gear comprising a first gear form;
   a second gear form formed on the second drive gear; and
   a second pinion gear driven by the first pinion gear and engaged to the driven member, wherein the second gear form transfers rotation of the second drive gear to the first pinion gear through the first gear form only when the handle member is moved from the unfired position to the fired position.

3. The drive assembly of claim 2, wherein the gear drive mechanism further comprises an engagement spring engaged to the second drive gear, wherein the engagement spring biases the second drive gear toward the first pinion gear.

4. The drive assembly of claim 1, wherein the first rive gear is a pinion quarter gear and the second drive gear is a spiral radius gear.

5. The drive assembly of claim 1, wherein the gear drive mechanism further comprises:
   a lobe driven by the handle member; and
   a flexible link engaged to the first drive gear and the lobe, wherein the flexible link comprises a first loop engaged to the lobe and a second loop engaged to the first drive gear.

6. The drive assembly of claim 1, wherein the handle member is substantially perpendicular to the support surface when in the unfired position, and is substantially parallel to the support surface when in the fired position.

7. The drive assembly of claim 1, wherein the implement is a food processing implement comprising a plurality of blades disposed about a central shaft.

8. The drive assembly of claim 1, wherein the handle member is pivotable about a fourth axis of rotation that is perpendicular to the third axis of rotation, and wherein the fourth axis of rotation is offset from and does not intersect the third axis of rotation.

9. A drive assembly movable between an unfired position and a fired position to drive an implement, the drive assembly comprising:
   a gear housing;
   a gear drive mechanism disposed within the gear housing, the gear drive mechanism including:
      a first drive gear rotatable about a first axis of rotation,
      a return spring engaged to the first drive gear, the return spring biasing the first drive gear to the unfired position,
      a second drive gear rotatable about a second axis of rotation, the second drive gear being engaged to the first drive gear at a mesh point, and
      a driven member disposed at least partially outside of the gear housing and engaged to the implement; and
   a handle member engaged to the first drive gear and movable between the unfired position and the fired position,
   wherein the driven member and the implement are driven only when the handle member is moved from the unfired position to the fired position, and
   wherein the distance between the mesh point and the first axis of rotation is longer when the handle member is in the fired position than when the handle member is in the unfired position, and
   wherein the gear drive mechanism further comprises:
      a lobe driven by the handle member; and
      a flexible link engaged to the first drive gear and the lobe, wherein the flexible link comprises a first loop engaged to the lobe and a second loop engaged to the first drive gear.

10. The drive assembly as set forth in claim 9, wherein the gear drive mechanism further comprises:
    a first pinion gear comprising a first gear form;
    a second gear form formed on the second drive gear; and
    a second pinion gear driven by the first pinion gear and engaged to the driven member, wherein the second gear form transfers rotation of the second drive gear to the first pinion gear through the first gear form only when the handle member is moved from the unfired position to the fired position.

11. The drive assembly as set forth in claim 10, wherein the gear drive mechanism further comprises an engagement spring engaged to the second drive gear, the engagement spring biasing the second drive gear toward the first pinion gear.

12. The drive assembly as set forth in claim 9, wherein the first drive gear is a pinion quarter gear and the second drive gear is a spiral radius gear.

13. A drive assembly for driving an implement, the drive assembly comprising:
    a gear housing comprising a support surface for placement of a hand of a user;
    a gear drive mechanism disposed within the gear housing, the gear drive mechanism including:
       a first drive gear rotatable about a first axis of rotation;
       a second drive gear rotatable about a second axis of rotation, the second drive gear being engaged to the first drive gear; and
       a driven member driven by the second drive gear and rotatable about a third axis of rotation, the driven member being disposed at least partially outside of the gear housing and being engaged to the implement; and
    a handle member engaged to the first drive gear and movable between an unfired position and a fired position, the handle member being disposed on the gear housing proximate to the support surface,
    wherein the driven member is driven only when the handle member is moved from the unfired position to the fired position, and
    wherein the third axis of rotation extends through the support surface, and the handle member does not cross the third axis of rotation as the handle member is moved from the unfired position to the fired position, and
    wherein the handle member is pivotable about a fourth axis of rotation that is perpendicular to the third axis of rotation, and wherein the fourth axis of rotation is offset from and does not intersect the third axis of rotation.

14. A drive assembly for driving an implement, the drive assembly comprising:
    a gear housing comprising a support surface for placement of a hand of a user;
    a gear drive mechanism disposed within the gear housing, the gear drive mechanism including:
       a first drive gear rotatable about a first axis of rotation;
       a second drive gear rotatable about a second axis of rotation, the second drive gear being engaged to the first drive gear; and
       a driven member driven by the second drive gear and rotatable about a third axis of rotation, the driven member being disposed at least partially outside of the gear housing and being engaged to the implement; and
    a handle member engaged to the first drive gear and movable between an unfired position and a fired position, the handle member being disposed on the gear housing proximate to the support surface,
    wherein the driven member is driven only when the handle member is moved from the unfired position to the fired position, and
    wherein the third axis of rotation extends through the support surface, and the handle member does not cross the third axis of rotation as the handle member is moved from the unfired position to the fired position, and wherein the gear drive mechanism further comprises:
- a lobe driven by the handle member; and
- a flexible link engaged to the first drive gear and the lobe, wherein the flexible link comprises a first loop engaged to the lobe and a second loop engaged to the first drive gear.

* * * * *

UNITED STATES PATENT AND TRADEMARK OFFICE
CERTIFICATE OF CORRECTION

Page 1 of 1

PATENT NO.        : 9,089,243 B2
APPLICATION NO.   : 14/107907
DATED             : July 28, 2015
INVENTOR(S)       : E. Mark Harris et al.

It is certified that error appears in the above-identified patent and that said Letters Patent is hereby corrected as shown below:

IN THE SPECIFICATION

Column 1, Line 49 delete "towered" and replace with --lowered--;

Column 1, Line 52 delete "toot" and replace with --tool--;

Column 4, Line 66 delete "white" and replace with --while--;

IN THE CLAIMS

Claim 1, Column 6, Line 28 delete "ing all" and replace with --driving an--; and Claim 4, Column 7, Line 28 delete "rive" and replace with --drive--.

Signed and Sealed this
Twenty-sixth Day of January, 2016

Michelle K. Lee
*Director of the United States Patent and Trademark Office*